UNITED STATES PATENT OFFICE.

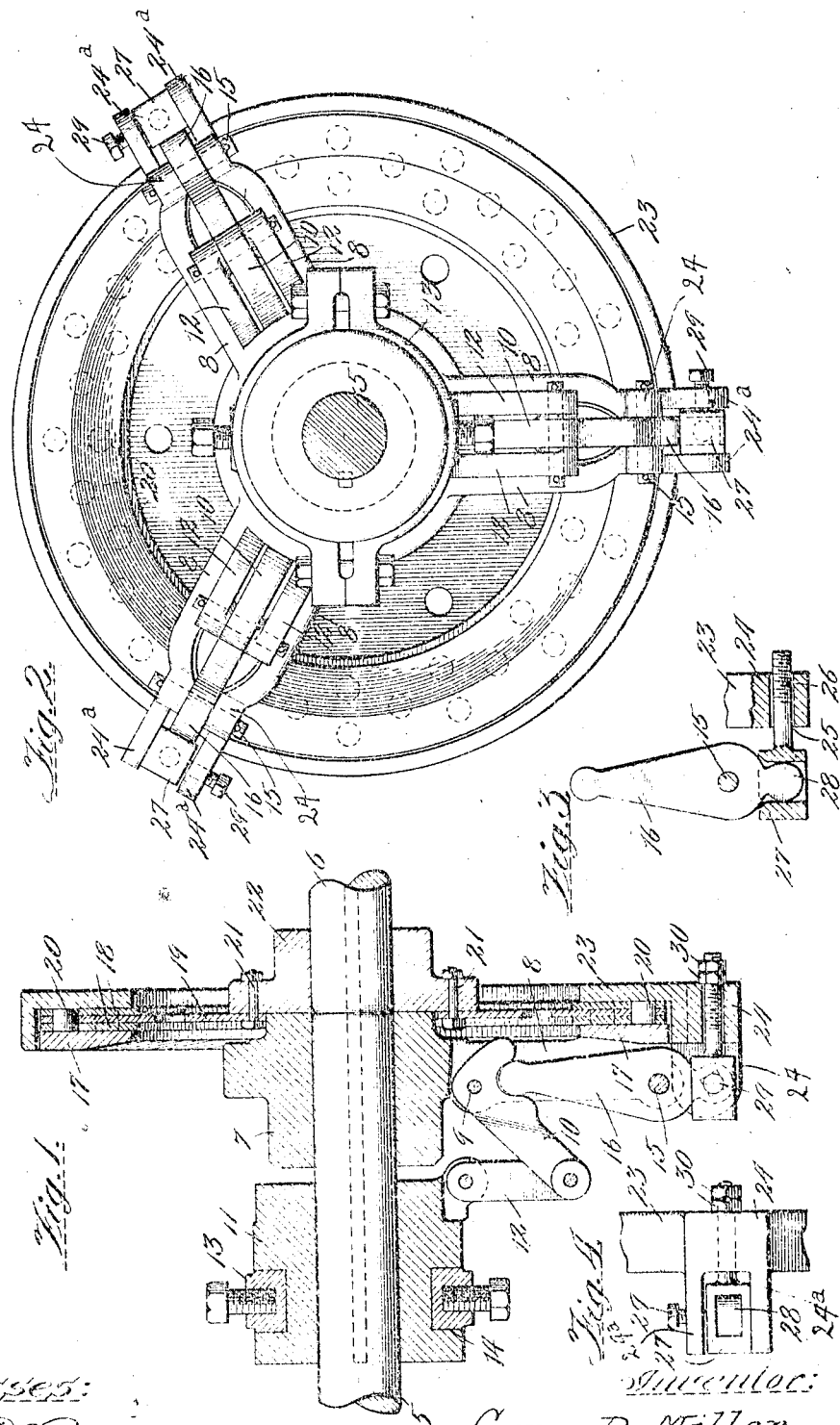

GEORGE D. MILLER, OF CHICAGO, ILLINOIS, ASSIGNOR TO HUGH MUIR COMPANY, OF CHICAGO, ILLINOIS, A CORPORATION OF ILLINOIS.

FRICTION-CLUTCH.

No. 892,175.  Specification of Letters Patent.  Patented June 30, 1908.

Application filed March 16, 1908. Serial No. 421,332.

*To all whom it may concern:*

Be it known that I, GEORGE D. MILLER, a citizen of the United States, residing at Chicago, in the county of Cook and State of Illinois, have invented a certain new and useful Improvement in Friction - Clutches, of which the following is a specification.

My invention relates to friction clutches and the object of the invention is to provide improved take-up mechanism to compensate for wear of the clutching parts.

I accomplish my object by the mechanism illustrated in the accompanying drawings, in which:

Figure 1 is a sectional view taken through the center of the shafts. Fig. 2 is a face view of the clutch looking from right to left in Fig. 1. Fig. 3 is a detail of the take-up device and its operating lever. Fig. 4 is a plan detail view of the take-up member. Fig. 5 is a fragmentary bottom view of the parts of the take-up device.

Similar numerals refer to similar parts in the different views.

The purpose of the clutch is to transmit motion from one shaft to another. In so far as the principles of the mechanism are concerned, it is immaterial which is the driving and which the driven member.

Let it be assumed that the shaft 5 is the driving shaft and shaft 6 the driven shaft. A spider 7 is rigidly fastened upon shaft 5 so as to rotate therewith, without shifting. Said spider is provided in the present instance with three arms 8, each of which carries a pin 9, serving as a fulcrum for the operating lever 10. Said levers may be rotated about their fulcrums in any suitable manner; the preferred means being the collar 11 which is splined or otherwise secured to said shaft 5 in such manner as to be shiftable thereon but rotatable therewith. The collar 11 is connected to each one of the levers 10 by means of links 12. A non-rotating split ring or collar 13 is let into a groove 14 in collar 11, and the parts are so arranged that when the ring is shifted it will produce a shifting movement of the collar 11 without preventing rotation thereof. When the collar 11 is shifted along shaft 5 it causes the rotation of the levers 10 about their fulcrums 9. Near the extremity of each of the arms 8 of the spider is located a pin 15 which serves as a fulcrum for a lever 16. Levers 16 are adapted to coöperate at the inner end with the levers 10, the preferred connection being that of a knuckle joint as illustrated in Fig. 1.

A friction ring 17 is formed upon the arms 8 concentric with shaft 5 and is adapted to contact one of the friction rings 18 which is rigidly fastened to the friction disk 19 by dowel pins 20 or other suitable means. These friction rings 18 are preferably located on both surfaces of said friction disk and consists preferably of paper, fiber or similar material. The friction disk 19 consists in the present instance of a semi-flexible steel plate which is secured by means of bolts 21 or other devices, to a hub 22 rigidly fastened to shaft 6. An annular hood 23 is so constructed as to contact the friction disk opposite to the ring 17 and to coöperate with said ring to clutch and release the friction rings 18.

Lugs 24 corresponding in number to the number of arms 8 are formed on the periphery of hood 23, each lug 24 having an aperture 25 extending parallel to the axes of the shafts 5 and 6, as best shown in Fig. 3. Passing through the aperture in each lug is a take-up member having a threaded stud 26 terminating in a housing 27, adapted to receive the head 28 formed at the end of the lever 16. A pair of wings 24ª extends horizontally from each lug 24 to each side of the adjacent housing, and a set screw 29 screws into and through one of said wings so as to force the housing against the companion wing and thus bind it between the lugs so that when the head 28 on lever 16 moves toward the right (Fig. 1) hood 23 will be positively moved away from the disk to thereby release it.

In operation, when the collar 11 is shifted to the right as shown in Fig. 1 the lever 16 will be rotated in such direction about its fulcrum 15 as to move the take-up member 26, 27 to the left and thereby move hood 23 to the left to clutch the friction rings 18 between the hood and the laterally fixed ring 17 on the spider. The amount of pressure which this movement will produce may be regulated by regulating the adjustment of the nuts 30 upon stud 26. The farther these nuts are screwed toward housing 27 the greater will be the resulting friction, within the operating limit of the device. This same adjustment will also compensate for wear, and as the friction rings 18—18 become thinned and worn away the hood 23 may be brought closer in by readjusting the nuts upon the stud. It will thus be seen that the take-up or adjusting device is very simple and yet is direct and positive, and will remain in the position set until wear of the friction members requires readjustment. No special care is required in forming the parts of the take-up device for it affords a wide range of adjustment and is operative under practically all conditions.

What I claim as new and desire to secure by Letters Patent, is:

1. In a clutch, the combination of two clutch members, one being shiftable relatively to the other for coöperating therewith, a lever fulcrumed on the non shiftable clutch member, a stud having a nut adapted to engage one side of the shiftable clutch member and a housing located on the other side of said clutch member, said housing being adapted to receive a portion of said lever to be operated thereby, lugs formed on said shiftable clutch member on opposite sides of said housing, and means for preventing movement of said housing relatively to said lugs when the clutch is being released.

2. In a clutch, the combination of two clutch members, one being shiftable relatively to the other for coöperating therewith, a lever fulcrumed on the non shiftable clutch member, a stud having a nut adapted to engage one side of the shiftable clutch member and a housing located on the other side of said clutch member, said housing being adapted to receive a portion of said lever to be operated thereby, lugs formed on said shiftable clutch member on opposite sides of said housing and a set screw in one of said lugs for forcing the housing against the companion lug.

In witness whereof, I have hereunto subscribed my name in the presence of two witnesses.

GEORGE D. MILLER.

Witnesses:
DWIGHT B. CHEEVER,
C. J. CHRISTOFFEL.